Aug. 7, 1951     E. A. STULLER     2,562,964
TIRE CHAIN LINK
Filed March 12, 1948
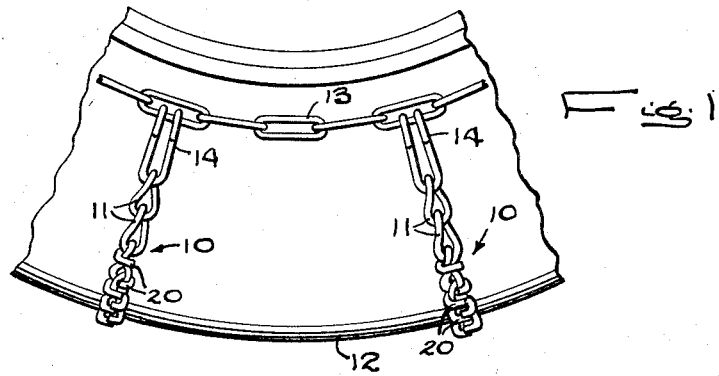
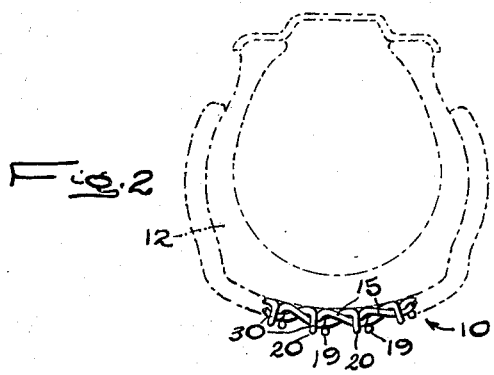
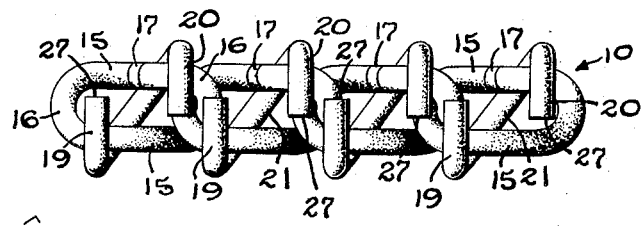 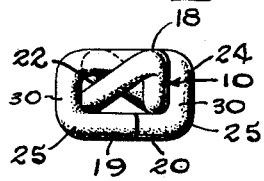
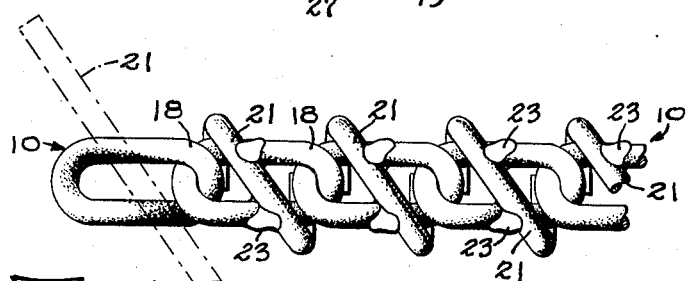
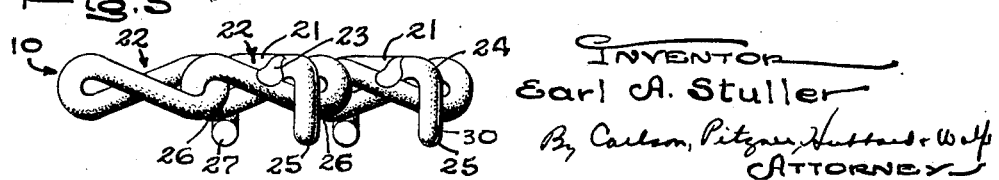
INVENTOR
Earl A. Stuller
By Carlson, Pitzner, Hubbard & Wolf
ATTORNEY Patented Aug. 7, 1951

2,562,964

UNITED STATES PATENT OFFICE 2,562,964

TIRE CHAIN LINK

Earl A. Stuller, Dixon, Ill., assignor to Columbus McKinnon Chain Corporation, Tonawanda, N. Y., a corporation of New York Application March 12, 1948, Serial No. 14,625

9 Claims. (Cl. 152—245)

The present invention pertains generally to tire chains for vehicles, and more specifically to a link structure having particular utility in connection with the road engaging sections of such chains.

One object of the invention is to provide a link for use in the cross tread section of a tire chain and having substantially improved wearing qualities tending to produce a proportional increase in life.

Another object is to form auxiliary ground engaging elements on each chain link by employing a crossbar wrapped around the chain link in a novel manner so as to impart substantially greater flatness and surface area to the tire engaging side of the link while increasing the strength thereof, and at the same time providing the wear resisting and traction producing elements on the ground engaging side of the chain.

A more detailed object is to provide a tire chain link of the twisted type having a crossbar seated in the diagonal groove in the tire engaging side of the link and opposite end portions of the bar bent around the link to form transversely extending ground engaging elements on the other side thereof.

The invention also resides in certain novel structural features by which the foregoing objects are accomplished.

Other objects and advantages will become apparent as the following detailed description proceeds, taken in connection with the accompanying drawings, wherein:

Figure 1 is a fragmentary side elevation of a tire chain embodying the invention in position upon the tire of a vehicle wheel.

Fig. 2 is a side elevation showing a portion of one of the cross tread sections of the tire chain of Fig. 1, the vehicle tire and rim being indicated in dot-dash sectional outline.

Fig. 3 is an elevational view of the ground engaging side of the cross chain.

Fig. 4 is a plan view of the tire engaging side of the cross chain.

Fig. 5 is a side view of the cross chain.

Fig. 6 is an end view of one of the links of the cross chain.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

Referring now to the drawings, a plurality of the improved chain links indicated generally at 10 are interlocked together and with other links 11 to form a crosspiece which is adapted to extend around the tread of a vehicle tire 12 as shown in Figs. 1 and 2. Chains of the type illustrated are usually fastened to the tire by tightening chains 13 which extend along and transversely around opposite side walls of the tire and are connected at spaced points by hooks 14 on opposite ends of the cross chains.

In accordance with standard practice, the interlocked links 10 and 11 are made by first forming a piece of wire of rounded cross section into a flat oblong loop having parallel side legs 15 and rounded ends 16 and a welded joint 17 at the center of one of the side legs. Then, the opposite ends 16 are gripped individually and twisted relative to each other about the longitudinal axis of the loop and through approximately a right angle. Each of the links thus twisted will present two diagonally opposed points 18 for engagement with the tire tread on one side of the chain and also similar points of engagement with the road surface on the other side, so that all of the links in the cross chain are similarly positioned relative to both the tire and the road surface. Thus, the cross chain as a whole possesses some flatness which resists the tendency of the cross chain to roll on the tire in service use.

The present invention takes advantage of the twisted character of the links 10 as described above to enable one and preferably two similar ground engaging elements or teeth 19 and 20 to be extended transversely across the ground engaging side of each link 10 near opposite ends thereof, and to be held securely on the link in spite of the irregular contour resulting from the twisting above referred to. Herein, two such ground engaging teeth are provided on each link, and these project in opposite directions partially across the link beyond the longitudinal center line thereof and disposed parallel to each other with the teeth 19 and 20 of the adjacent links lying relatively close to each other as shown in Fig. 3.

To secure the auxiliary ground engaging elements 19 and 20 permanently and rigidly to the links 10 without danger of bending or dislodgment in service use, these elements are formed by the opposite end portions of a bar or strap 21 of hardened metal extending across and secured as by welding to the tire engaging side of the links 10, the end portions of the bar being bent in opposite directions around opposite ends of the link. Preferably, the bar 21 is composed of wire of round cross section of substantially the same diameter as the wire from which the chain links proper are formed. To avoid increasing the overall thickness of the chain links, the intermediate part of the bar 21 is left straight and is seated in the diagonally extending groove 22 which results from the twisting operation above described. Then welds 23 are formed on opposite sides of the bar to secure the same to opposite legs 15 of the chain link substantially at the longitudinal center of the latter, leaving the end portions of the bar projecting from the links as shown in phantom in Fig. 4.

Thereafter, the projecting end portions of the bar 21 are first bent at right angles as indicated at 24 (Figs. 5 and 6) to extend these end portions across the edges of the opposite link legs 15. Then, the straight end portions are bent reversely in opposite directions and in parallel planes as indicated at 25 to extend these portions transversely across the other or ground engaging side of the chain loop, these planes lying short of the ends of the link but intersecting the ends 16 of the adjacent interlocked links as shown in Figs. 3 and 4. These portions which form the ground gripping teeth 20 are left straight so as to lie in a common plane spaced outwardly from the plane of the chain loop proper and disposed substantially parallel to the portion of the bar 21 lying in the groove 22. The reverse bends 25 are disposed at the diagonal points 26 on the ground engaging side of the chain link and are thus backed by the latter so as to leave only a relatively short length of the chain teeth 20 unsupported. These teeth constitute the road engaging elements, and their abrupt right angular ends 27 terminate short of the opposite leg 15 of the chain link but project beyond the longitudinal center line of the link so that the ends 27 of the adjacent links overlap each other as shown in Fig. 3.

The ground gripping teeth 20 when formed and mounted as above described possess numerous advantages. Being parallel to the direction of travel of the vehicle wheel and extending only partially across the chain links, these teeth offer minimum resistance to full entry into muddy and icy road surfaces. They present side surfaces of substantial areas, and, therefore, resist lateral skidding or sliding of the vehicle wheel. At the same time, their abrupt ends 27 bite into the road surface and provided added traction in both directions of turning of the vehicle wheel.

In addition, the elements 20, being parallel and projecting in opposite directions in overlapping relation, impart substantial flatness to the ground engaging side of the link whereby the latter more effectively resists rolling or twisting of the cross chain as a whole relative to the tire. This action is augmented by the increased flatness and larger surface area which the other side of the chain link presents to the tire surface. Thus, the full length of the diagonally extending part of the crossbar 21 lies in the plane of the diagonally opposite corner areas 18 of the twisted chain link and completes a rectangle which lies flat against the tire tread.

Moreover, the chain loop is reinforced considerably by the diagonally extending bar 21 and the welding thereof to opposite legs of the chain loop. This and the improvement in flatness of the ground engaging side of the link as described above are achieved without increasing the thickness of the chain link. That is to say, the diagonal bar 21 lies in the diagonal groove already present in the standard twist link, and thus does not add to the bulk of the latter.

The foregoing advantages are in addition to the primary function of the elements 20 in providing added metal and thickness on the ground engaging side of the chain links. Thus, these elements remain effective in service use until they have become worn off completely. Then, the chain link itself is exposed for engagement with the ground, whereupon the chain as a whole will have a further normal service life. Actually, this added life is increased considerably by the bent down portions 30 of the strap 21 which wear off with the chain as a whole. During this period, the portions 21 increase considerably the resistance of the chain to lateral skidding of the vehicle wheel.

Finally, the improved link construction lends itself readily to low cost mass production methods of manufacture. Thus, the chain loops may be formed and interlocked together and twisted in the usual way after which the bars 21 are laid in the grooves of the successive links and welded therein, these operations being performed on one side only of the chain. Finally, the projecting ends of the bar are wrapped around opposite ends of the chain links by simple bending operations. As a result, the cost of the cross chain as a whole is not increased appreciably as compared to standard constructions, but its service life is more than doubled and its effectiveness in improving traction and resisting skidding of the vehicle wheel is increased several times.

I claim as my invention:

1. A tire cross chain comprising a series of interlocked loops, each loop being twisted to dispose its ends substantially at right angles to each other and form diagonal grooves on opposite sides of the loop, bars, one for each of said loops, said bars having straight intermediate portions extending parallel to each other and secured in said diagonal grooves on the tread-engaging side of the chain loops, and welds formed on opposite sides of each of said portions respectively securing the latter to the opposite side legs of the chain loop, the opposite end portions of each of said bars being bent in planes short of the chain loop ends around the adjacent side legs of the chain loop and into parallelism with each other but projecting transversely of said cross chain in opposite directions on the ground-engaging side of the chain loop.

2. A tire cross chain comprising a series of interlocked loops, each loop being twisted to dispose its ends substantially at right angles to each other and form diagonal grooves on opposite sides of the loop, and bars, one for each of said loops, said bars having straight intermediate portions extending parallel to each other and secured in said diagonal grooves on the tread-engaging side of the chain loops, opposite end portions of each of said bars being wrapped in opposite directions around opposite end portions and opposite side legs of its supporting chain loop and then reversely onto the ground engaging side of the loop.

3. A link for tire chains comprising an elongated closed oblong loop adapted on one side to engage a tire and on the opposite side to engage the ground and having opposite ends twisted through approximately a right angle whereby to form diagonally extending grooves in opposite sides of the loop, and a bar substantially longer than said loop having an intermediate portion extending along and seated in one of said grooves on said tire engaging side of said loop, welds on opposite sides of said intermediate portion securing the same to opposite side legs of said loop substantially at the longitudinal center of the loop, the opposite projecting end portions of said bar extending in reverse directions around opposite end portions and said opposite side legs of said loop and inwardly at least partially across said opposite side of the loop, said end portions of said bar forming ground-engaging elements which are inclined relative to said intermediate portion and are disposed in a plane substantially parallel thereto.

4. A tire link comprising a twisted loop adapted on one side to engage a tire and on the opposite side to engage the ground, and a bar extending diagonally across said loop on said tire engaging side thereof and having projecting end portions bent around opposite end portions of the loop and at least partially across the ground engaging side of the loop in spaced parallel planes extending transversely of the loop and short of the ends thereof.

5. A tire chain link comprising a loop having side legs and closed at opposite ends with one side of the loop adapted to engage a tire and the opposite side adapted to engage the ground, and a strap extending transversely across the tire engaging side of said loop and secured to each of said legs, opposite end portions of said strap each extending around the edges of the adjacent end portion of said loop and reversely across the ground engaging side of the latter to form a tooth extending transversely of the loop and adapted to engage the ground when said link is incorporated in a chain and used on a tire.

6. A tire chain link comprising an elongated closed loop, a bar wrapped around said loop and having generally straight parallel end portions spaced along the loop from the longitudinal center thereof and projecting in opposite directions and transversely across opposite end portions of the loop, and means securing said bar to said loop.

7. A wheel tire traction chain link comprising a twisted link and a reinforcing bar disposed to extend obliquely transversely of said link at the tire tread contacting side thereof, said reinforcing bar being fixed to the opposite side leg portions of said link and having its opposite ends extending beyond the plan view sidewise configurations of said link and then bent around the side leg portions of said link and projecting therebeyond in the direction of roadway surface engagement.

8. A wheel tire traction chain link comprising a twisted link and a reinforcing bar disposed to extend obliquely transversely of said link at the tire tread contacting side thereof, said reinforcing bar being fixed to the opposite side leg portions of said link, and having its opposite ends extending beyond the plan view sidewise configurations of said link and then bent around the side leg portions of said link and projecting therebeyond in the direction of roadway surface engagement with the opposite end portions thereof bent inwardly so as to provide said bar to C-shaped form in side view.

9. A wheel tire traction chain link comprising a substantially 90° twisted link and a reinforcing bar disposed to extend obliquely transversely of said link at the tire tread contacting side thereof, said reinforcing bar being crimped around the side leg portions of said link at the relatively low portions thereof as viewed from the tire contacting side thereof while avoiding interferences with the linking of adjacent links into the end portions of said link, said bar member having its opposite ends extending beyond the plan view sidewise configurations of said link and then bent downwardly around the opposite side leg portions of said link and thence inwardly so as to provide the reinforcing bar in substantially C-shaped form.

EARL A. STULLER.

REFERENCES CITED

The following references are of record in the file of this patent:

UNITED STATES PATENTS

| Number | Name | Date |
|---|---|---|
| 1,296,069 | Bahring | Mar. 4, 1919 |
| 1,461,327 | Reyburn | July 10, 1923 |
| 1,845,026 | Lewis | Feb. 16, 1932 |
| 2,180,098 | Hall | Nov. 14, 1939 |
| 2,295,722 | Donaldson | Sept. 15, 1942 |